(12) United States Patent
Ito et al.

(10) Patent No.: US 10,094,398 B2
(45) Date of Patent: Oct. 9, 2018

(54) FLUID TRANSFER APPARATUS

(71) Applicant: TOYOTA JIDOSHA KABUSHIKI KAISHA, Toyota-shi, Aichi-ken (JP)

(72) Inventors: Hirokazu Ito, Susono (JP); Yasushi Yoshihara, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 86 days.

(21) Appl. No.: 15/201,984

(22) Filed: Jul. 5, 2016

(65) Prior Publication Data

US 2017/0009787 A1   Jan. 12, 2017

(30) Foreign Application Priority Data

Jul. 8, 2015  (JP) ................................ 2015-136925

(51) Int. Cl.
| | |
|---|---|
| F15D 1/00 | (2006.01) |
| F15D 1/06 | (2006.01) |
| F15D 1/02 | (2006.01) |
| F16L 55/027 | (2006.01) |

(52) U.S. Cl.
CPC .............. *F15D 1/007* (2013.01); *F15D 1/02* (2013.01); *F15D 1/06* (2013.01); *F16L 55/02772* (2013.01)

(58) Field of Classification Search
CPC ... F15D 1/007; F15D 1/20; F15D 1/02; F15D 1/06; F16L 55/02772; Y10T 137/2196
USPC ........................................................ 137/828
See application file for complete search history.

(56) References Cited

U.S. PATENT DOCUMENTS

| | | | | |
|---|---|---|---|---|
| 6,079,214 A | * | 6/2000 | Bishop | F04F 7/00 62/467 |
| 6,672,847 B2 | * | 1/2004 | Dooley | F04B 43/09 417/394 |
| 6,702,782 B2 | * | 3/2004 | Miller | A61M 25/005 138/111 |
| 8,432,057 B2 | * | 4/2013 | Filardo | F03B 13/188 290/54 |

FOREIGN PATENT DOCUMENTS

| | | |
|---|---|---|
| CN | 101695610 A | 4/2010 |
| CN | 103307198 B | 4/2015 |
| JP | H03-149373 A | 6/1991 |
| JP | H09-317970 A | 12/1997 |
| JP | 2011-185409 A | 9/2011 |
| JP | 5105292 B2 | 12/2012 |
| WO | 1997/042412 A1 | 11/1997 |
| WO | 2011/011026 A1 | 1/2011 |

OTHER PUBLICATIONS

Koji Fukagata, "Turbulent Friction Drag Reduction by Traveling Wave-Like Input from Wall", Proceeding of the 60th National Congress of Theoretical and Applied Mechanics (2011), 2 pages. (English abstract provided).

* cited by examiner

*Primary Examiner* — Eric Keasel
(74) *Attorney, Agent, or Firm* — Hunton Andrews Kurth LLP (57) ABSTRACT

A fluid transfer apparatus includes a spiral pipe that is formed by an elastic tube wound in a spiral manner, and a fluid to be transferred flows in the spiral pipe. The fluid transfer apparatus further includes a speaker that is configured to generate a pressure wave in a working fluid in the tube that is a medium, and the pressure wave causes a change of the cross-sectional area of a flow channel of the tube.

12 Claims, 6 Drawing Sheets

Flow direction FD
(Direction of flow channel length L)

Fig. 7

Traveling wave

FLUID TRANSFER APPARATUS

CROSS-REFERENCE TO RELATED APPLICATION

The present application claims priority to Japanese Patent Application No. 2015-136925 filed on Jul. 8, 2015, which is incorporated herein by reference in its entirety.

BACKGROUND

Technical Field

Preferred embodiments of the invention relate to a fluid transfer apparatus that transfers a fluid through a pipe.

Background Art

Japanese Patent Application Publication No. 2011-185409 (JP2011-185409 A) discloses a friction drag reducing device that reduces friction drag on a moving object in a fluid. The friction drag reducing device is configured to generate, on the outer wall of the moving object, a traveling wave propagating in the direction of movement of the moving object. The traveling wave thus generated can impart a regular vibration (traveling wave-like wall deformation) against the turbulence that occurs between the surface of the outer wall of the moving object and the fluid, thereby reducing the friction drag of the fluid.

Non-patent Literature document, Koji FUKAGATA, "Turbulent Friction Drag Reduction by Traveling Wave-Like Input from Wall", Proceeding of The 60th National Congress of Theoretical and Applied Mechanics (2011), discloses that the friction drag (turbulent friction drag) of the fluid transfer pipe in which a fluid flows can be reduced by imparting, to the inner wall of the fluid transfer pipe, a deformation like a traveling wave that propagates in the longitudinal direction of the flow channel.

Technical Problem

When a traveling wave-like deformation is imparted to an inner wall of a pipe for transferring a fluid in order to reduce the friction drag of the pipe, a deformation like a traveling wave that propagates in the longitudinal direction of the flow channel needs to be imparted to the inner wall of the pipe so as to make the inner wall expand and contract in the radial direction of the flow channel. In practice, there is a problem of how to provide an arrangement that appropriately imparts such a traveling wave-like deformation to the inner wall of the pipe.

SUMMARY

Preferred embodiments address the above-described problem and have an object to provide a fluid transfer apparatus that can appropriately impart, to an inner wall of a pipe in which a fluid to be transferred flows, a traveling wave-like deformation that makes the inner wall expand and contract in the radial direction of the flow channel.

A fluid transfer apparatus according to preferred embodiments includes: a spiral pipe which is formed by an elastic tube wound in a spiral manner and in which a fluid to be transferred flows; and a first pressure wave generator configured to generate a pressure wave in a working fluid in the tube that is a medium, the pressure wave causing a change of a cross-sectional area of a flow channel of the tube, which is an area of a cross section of the tube that is perpendicular to an axial direction of the tube.

The spiral pipe may include a pressure wave attenuation part that is configured to attenuate the pressure wave, the pressure wave attenuation part being a part of the spiral pipe on a front side in a progression direction of the pressure wave propagating in the tube.

The spiral pipe may be configured so that the cross-sectional area of the flow channel of a tube in the pressure wave attenuation part is greater than a cross-sectional area of the flow channel of the tube in a part other than the pressure wave attenuation part.

An interior of a tube in the pressure wave attenuation part may be filled with a sound absorbing material.

The pressure wave attenuation part of the spiral pipe may be made of a material softer than a material of a part other than the pressure wave attenuation part.

An inner wall of a tube in the pressure wave attenuation part may be made of a porous material.

In the pressure wave attenuation part, a part of a tube wall that separates inner channels of adjacent turns of a tube wound in a spiral manner may be cut.

The fluid transfer apparatus may further include a second pressure wave generator that is connected to an end of the tube on a front side in a progression direction of the pressure wave propagating in the tube and configured to generate a pressure wave with a phase opposite to that of the pressure wave reaching at the end of the tube.

The fluid transfer apparatus may further include an outer pipe that is made of a harder material than the tube and is formed to surround the spiral pipe.

An amplitude of a traveling wave that is produced in an inner wall of the spiral pipe by propagation of the pressure wave in the tube and propagates in a direction of flow of the fluid to be transferred may satisfy a relation expressed by a following formula (1):

$$a = \alpha \times \frac{v}{u_\tau} \quad (1)$$

where a coefficient $\alpha$ falls within a range of $3 \leq \alpha \leq 10$, $v$ denotes a kinematic viscosity of the fluid to be transferred, and $U_\tau$ denotes a wall friction velocity.

A wavelength $\lambda$ of a traveling wave that is produced in an inner wall of the spiral pipe by propagation of the pressure wave in the tube and propagates in a direction of flow of the fluid to be transferred may satisfy a relation expressed by a following formula (2):

$$\lambda = \beta \times \frac{v}{u_\tau} \quad (2)$$

where a coefficient $\beta$ falls within a range of $235 \leq \beta \leq 471$, $v$ denotes a kinematic viscosity of the fluid to be transferred, and $U_\tau$ denotes a wall friction velocity.

A phase velocity c of a traveling wave that is produced in an inner wall of the spiral pipe by propagation of the pressure wave in the tube and propagates in a direction of flow of the fluid to be transferred may satisfy a relation expressed by a following formula (3):

$$c = \gamma \times U_{lam} \quad (3)$$

where a coefficient $\gamma$ falls within a range of $\frac{2}{3} \leq \gamma \leq 1$, and $U_{lam}$ denotes a flow velocity of the fluid to be transferred that flows in the spiral pipe.

According to the fluid transfer apparatus of preferred embodiments, a first pressure wave generator generates a pressure wave in an elastic tube that is wound in a spiral manner to form a spiral pipe, and in the tube the pressure wave thus propagates in a spiral manner. As a result, a traveling wave-like deformation can be appropriately imparted to an inner wall of the spiral pipe in such a manner that a fluid to be transferred flows so as to make the inner wall expand and contract in a radial direction of a flow channel.

DETAILED DESCRIPTION

In the following, embodiments of the present application will be described with reference to the drawings. Throughout the drawings, the same or similar components are denoted by the same reference numerals. The present application is not limited to the embodiments described below, and various modifications can be made to the embodiments without departing from the spirit of the present application.

First Embodiment

In the following, a first embodiment of the present application will be described with reference to FIGS. 1 to 6.

Configuration of Fluid Transfer Apparatus
According to First Embodiment

Figure 1A:
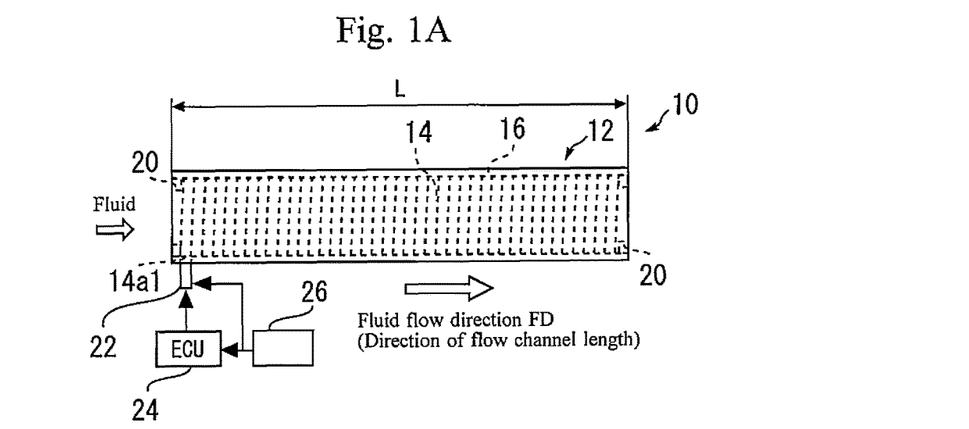
FIGS. 1A and 1B are diagrams for illustrating an entire configuration of a fluid transfer apparatus according to a first embodiment of the present application (FIG. 1A is a side view, and FIG. 1B is a view seen from a flow direction of a fluid.
Figure 1B:
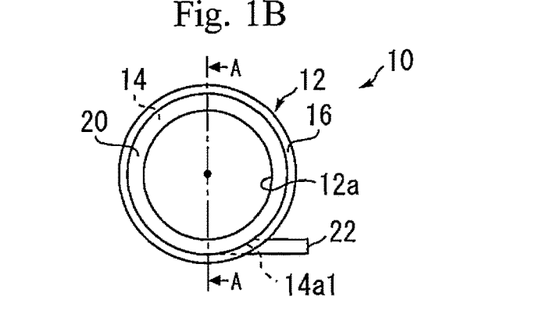

FIGS. 1A and 1B are diagrams for illustrating an entire configuration of a fluid transfer apparatus 10 according to a first embodiment of the present application (FIG. 1A is a side view, and FIG. 1B shows a fluid transfer apparatus 10 viewed from the side of a fluid inlet of a fluid transfer pipe 12). The fluid transfer apparatus 10 shown in FIG. 1A and FIG. 1B includes the fluid transfer pipe 12 through which a fluid to be transferred flows.

The use of the fluid transfer pipe 12 according to this embodiment is not particularly limited. For example, the fluid transfer pipe 12 can be suitably used as a pipe for transferring a fluid required for operation of an internal combustion engine. The fluid to be transferred in the fluid transfer pipe 12 can be any gas or liquid, although it is supposed in this embodiment that gas flows in the fluid transfer pipe 12, for example. In a case of an internal combustion engine, the fluid transfer pipe 12 can be used as an intake air pipe through which air is transferred, for example.

In this specification, as shown in FIG. 1A and FIG. 1B, a direction of the flow of the fluid in the fluid transfer pipe 12 from an upstream side to a downstream side is referred to as a "fluid flow direction FD" or simply as a "flow direction FD". The flow direction FD is the same as a longitudinal direction of a flow channel of the fluid transfer pipe 12. Note that, when the fluid transfer pipe is a straight pipe, such as the fluid transfer pipe 12, the "fluid flow direction FD" is parallel with a centerline of the straight pipe.

Figure 2:
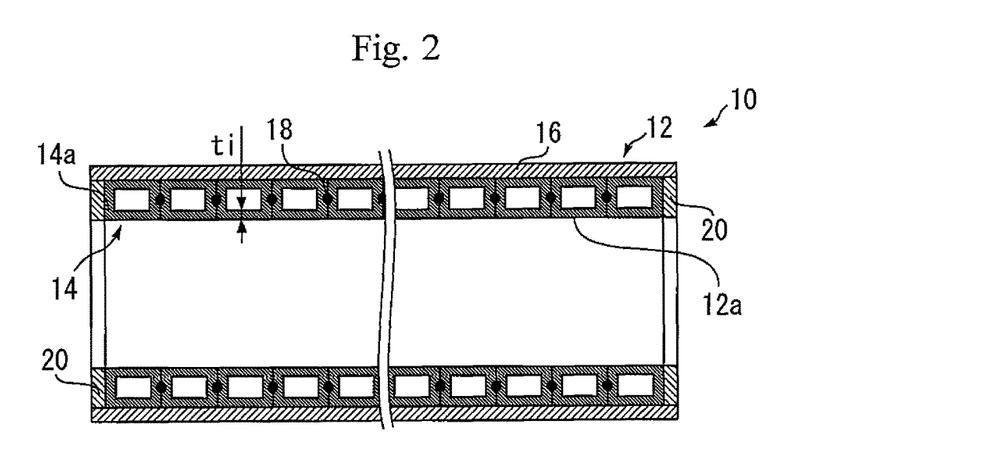
FIG. 2 is a cross-sectional view of a fluid transfer pipe taken along a line A-A that passes through an axial center of a fluid transfer pipe shown in FIG. 1B.
Figure 3:
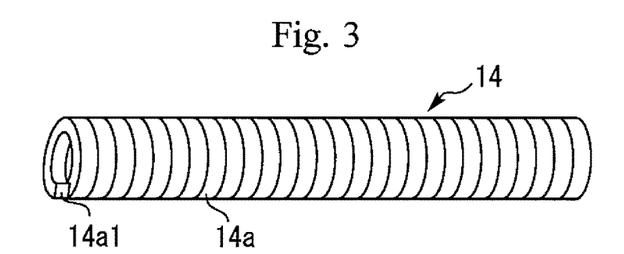
FIG. 3 is a perspective view of the whole of a spiral pipe.

As shown in FIG. 1B, the fluid transfer pipe 12 according to this embodiment is a multilayer pipe including a spiral pipe 14 and an outer pipe 16 surrounding the spiral pipe 14. FIG. 2 is a cross-sectional view of the fluid transfer pipe 12 taken along a line A-A that passes through an axial center of the fluid transfer pipe 12 shown in FIG. 1B. FIG. 3 is a perspective view of the whole of the spiral pipe 14.

The spiral pipe 14 is formed by a long narrow elastic tube (in other words, a hollow linear member) 14a that is wound in a spiral manner to form a pipe. More specifically, the tube 14a is made of a material (essentially, an elastic body) that can expand and contract as an internal pressure of the tube 14a varies. In this embodiment, ethylene propylene rubber is used as the material of the tube 14a that has the properties described above, for example.

As shown in FIG. 2, the cross-sectional shape of the tube 14a according to this embodiment is a rectangle (in particular, a rectangle with longer sides extending in the fluid flow direction FD and shorter sides extending in the direction perpendicular to the fluid flow direction FD). Outer wall surfaces of adjacent turns of the tube 14a wound in a spiral manner are bonded to each other by an adhesive 18. In order to minimize interference with expansion or contraction of the spiral pipe 14, the adhesive 18 is preferably elastic. An inner wall of the spiral pipe 14 according to this embodiment is an inner wall 12a of the fluid transfer pipe 12 that comes into contact with the fluid to be transferred. Since the tube 14a having a rectangular cross section as shown in FIG. 2 is used, a smooth inner wall 12a with minimum irregularities can be provided without using any additional member.

The outer pipe 16 is a straight pipe and is made of a harder material than the spiral pipe 14 (tube 14a). The outer pipe 16 can be made of any material that is harder than the material of the spiral pipe 14, such as a metal or resin that satisfies the requirement. The outer pipe 16 has an inner diameter that is approximately equal to an outer diameter of the spiral pipe 14, and the spiral pipe 14 is press-fitted into the outer pipe 16. As shown in FIG. 2, a lid member 20 having an annular shape is disposed at each of the opposite ends of the spiral pipe 14 in the flow direction FD. The lid member 20 is press-fitted into the outer pipe. The lid member 20 restrains relative movement of the spiral pipe 14 and the outer pipe 16 with respect to each other in the flow direction FD. Note that the outer pipe 16 does not necessarily completely cover the whole of the spiral pipe 14 as shown in FIG. 1A and FIG. 1B but can have other configurations, such as a mesh wall, as far as it can restrain radial expansion of the spiral pipe 14 caused by a pressure wave described later.

The fluid to be transferred in the fluid transfer pipe 12 flows inside the spiral pipe 14, which is the inner pipe. The end of the tube 14a on the side of the upstream end of the spiral pipe 14 in the flow direction FD is an open end and serves as a pressure wave inlet 14a1. As shown in FIG. 1A and FIG. 1B, a speaker 22 serving as a pressure wave generator (which corresponds to a first pressure wave generator) is connected to the pressure wave inlet 14a1. The speaker 22 generates a pressure wave (more specifically, a sound wave) by converting an electrical signal into an air vibration. The characteristics of the pressure wave generated by the speaker 22 are controlled by an electronic control unit (ECU) 24. A preferred example of how to control the characteristics of the pressure wave will be described later with reference to the formulas (1) to (11). The speaker 22 and the ECU 24 are supplied with electric power by a battery 26. The pressure wave generator may be a pump that delivers a fluid under pressure, for example, as an alternative to the speaker 22.

The pressure wave generated by the speaker 22 is introduced into the tube 14a through the pressure wave inlet 14a1. In this embodiment, a medium (in other words, working fluid) used for propagation of the pressure wave in the tube 14a is helium, as an example. More specifically, the interior of the tube 14a is filled with helium serving as the medium. In the configuration according to this embodiment, the end of the tube 14a on the side of the downstream end of the spiral pipe 14 in the flow direction FD is a closed end, because the helium needs to be retained in the tube 14a. In an alternative configuration, however, the end may be an open end. More specifically, the end may be an open end, so that air (atmosphere), water or another medium that is externally supplied into the tube 14a can be discharged to the outside though the aforementioned end after propagating the pressure wave. The medium filling the interior of the tube 14a can also be argon, for example.

[Traveling Wave-Like Deformation of Wall]
(Effect of Imparting Traveling Wave-Like Deformation to Inner Wall of Fluid Transfer Pipe and Problems with Imparting of Deformation)

Figure 4A:
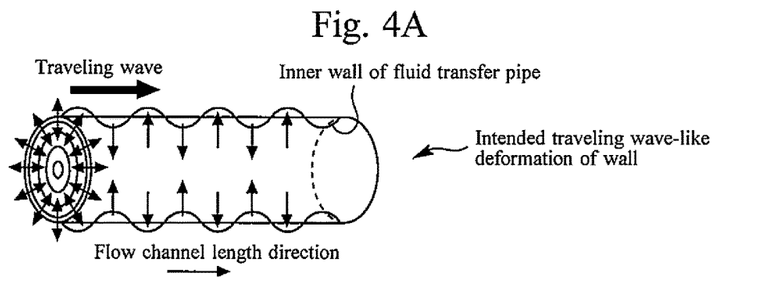
FIG. 4A is a diagram showing an intended traveling wave-like deformation of an inner wall of a fluid transfer pipe.
Figure 4B:
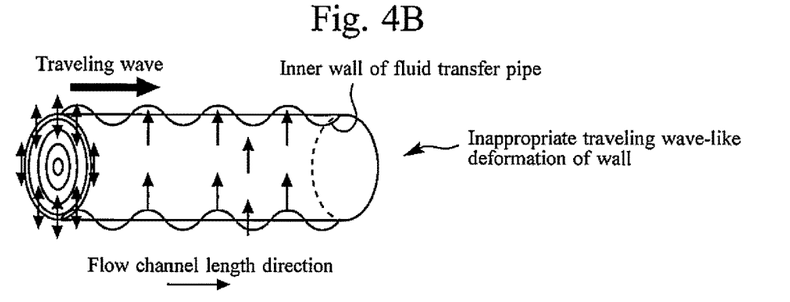
FIG. 4B is a diagram showing an inappropriate traveling wave-like deformation of the wall.

FIG. 4A is a diagram showing an intended traveling wave-like deformation of the wall, and FIG. 4B is a diagram showing an inappropriate traveling wave-like deformation of the wall. FIG. 4A shows how a traveling wave-like deformation that propagates in the longitudinal direction of the flow channel and makes the inner wall expand and contract in the radial direction of the flow channel is successfully imparted to the inner wall of the fluid transfer pipe. If such a deformation is imparted to the wall, a vortex can be prevented from occurring in the flow in the vicinity of the wall to bring the flow in the fluid transfer pipe closer to a laminar flow. As a result, the friction drag (turbulent friction drag) of the fluid transfer pipe can be reduced. Details of a mechanism of reducing the friction drag by imparting a traveling wave-like deformation to the wall are reported in Non-patent Document 1 listed above, for example. In practice, there is a problem of how to provide an arrangement that appropriately imparts, to the inner wall of the fluid transfer pipe, the traveling wave-like deformation that makes the inner wall expand and contract in the radial direction of the flow channel.

According to a possible approach to provide the arrangement described above, for example, a rubber pipe is used as the fluid transfer pipe, a plurality of (three, for example) piezoelectric elements are disposed at regular angular intervals in the circumferential direction on the outer circumference of the fluid transfer pipe, and a vibration is imparted to the fluid transfer pipe from the radially outer side of the fluid transfer pipe by the piezoelectric elements. This approach, however, has a problem in that any slight deviation between the input signals to the piezoelectric elements can lead to a change in the phase of the traveling wave in the fluid flow direction. If such a change in the phase of the traveling wave occurs, a vibration mode is obtained in which the entire inner wall of the fluid transfer pipe vibrates (or is deformed) in the same direction as shown in FIG. 4B. In such a vibration mode, a vibration component in the circumferential direction of the inner wall occurs in many parts of the inner wall of the fluid transfer pipe. The vibration in the circumferential direction can cause an increase of turbulence of the fluid flow and therefore cause an increase of the friction drag.

Figure 5:
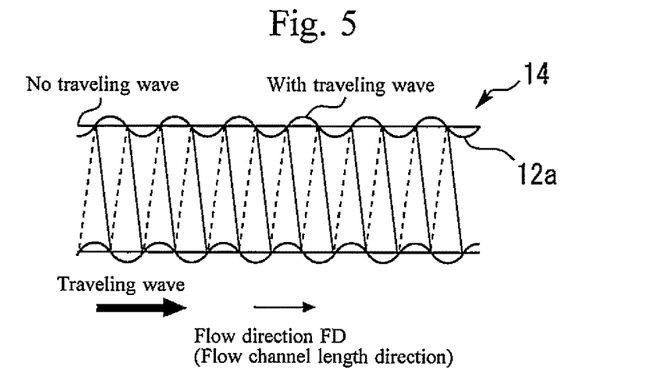
FIG. 5 is a diagram showing how a traveling wave-like deformation is imparted to an inner wall of a fluid transfer pipe.

Traveling Wave-Like Deformation of Wall in Fluid Transfer Apparatus According to First Embodiment FIG. 5 is a diagram showing how a traveling wave-like deformation is imparted to the inner wall 12a of the fluid transfer pipe 12. The pressure wave generated by the speaker 22 propagates in the medium in the tube 14a of the spiral pipe 14 in a spiral manner. As a result, the cross-sectional area of the flow channel of the tube 14a varies. More specifically, the tube 14a expands and contracts, and the cross-sectional area of the flow channel of the tube 14a increases and decreases. If the pressure wave is continuously generated, a periodic pressure pulsation occurs in the tube 14a, and the tube 14a periodically expands and contracts (that is, periodically expands and contracts in the radial direction). The "cross-sectional area of the flow channel of the tube 14a" used herein refers to the area of the cross section (of the flow channel) of the tube 14a that is perpendicular to the axial direction of the tube 14a.

In the configuration described above with reference to FIGS. 1 to 3, the inner wall of the spiral pipe 14 formed by the tube 14a is the wall (that is, the inner wall 12a) of the fluid transfer pipe 12 with which the transferred fluid is in contact. The pressure wave is applied to the interior of the tube 14a from the upstream end in the flow direction FD. In other words, when viewed in the flow direction FD, the pressure wave is applied to propagate in the tube 14a in the same direction as the flow direction FD. Therefore, when the pressure wave makes the tube 14a periodically expand and contract, a traveling wave-like deformation periodically occurs in the inner wall 12a formed by the tube 14a that is wound in a spiral manner and propagates in the same direction as the flow direction FD, and the inner wall 12a expands and contracts in the radial direction of the flow channel, as shown by the annotation "with traveling wave" in FIG. 5. On the other hand, the two straight lines shown by the annotation "no traveling wave" in FIG. 5 show the inner wall 12a in which no traveling wave-like wall deformation occurs. The two kinds of dashed lines in the same drawing show the spiral configuration of the spiral pipe 14.

According to the approach in this embodiment described so far, the traveling wave-like wall deformation is provided by generating a pressure wave in the tube 14a that is wound in a spiral manner to form the spiral pipe 14. Thus, unlike the case where the approach shown in FIG. 4B is used, a deformation in the radial direction can be appropriately imparted to the entire inner wall 12a, while preventing a deformation (vibration) in the circumferential direction from occurring in the inner wall 12a of the fluid transfer pipe 12. Furthermore, the fluid transfer apparatus 10 according to this embodiment can be easily provided using the rubber tube 14a and the speaker 22, which are versatile components. That is, the fluid transfer apparatus 10 with a simple configuration that has the effects described above can be provided at low cost.

With the fluid transfer pipe 12 according to this embodiment, the spiral pipe 14 is surrounded by the outer pipe 16, which is made of a harder material than the spiral pipe 14. The part to be deformed in a traveling wave-like manner as a result of expansion and contraction of the tube 14a is the inner wall 12a of the fluid transfer pipe 12 (which is formed by the inner wall of the spiral pipe 14 in this configuration). The outer pipe 16 made of a harder material can restrain the tube 14a from expanding outward in the radial direction of the spiral pipe 14. Therefore, provided that a pressure wave having the same amplitude is applied, the tube 14a can be more effectively made to expand inward in the radial direction of the spiral pipe 14 than in the case where there is not the outer pipe 16. Therefore, a traveling wave having a desired amplitude can be applied to the inner wall 12a with a reduced power consumption of the speaker 22, compared with an example where there is not the outer pipe 16. In addition, if the spiral pipe 14 can be freely deformed outward in the radial direction, the spiral pipe 14 itself may resonate with the pressure wave as a result of the spiral pipe 14 expanding and contacting when the pressure wave is applied thereto. If the outer pipe 16 restrains the spiral pipe 14 from the radially outer side thereof, however, such a resonance can be prevented without any additional measure.

[Example of Preferred Configuration of Fluid Transfer Apparatus]

(Preferred Characteristics of Traveling Wave for Achieving Good Friction Drag Reduction Effect)

As described above, the friction drag of the fluid transfer pipe 12 can be reduced by applying a traveling wave-like deformation in the radial direction to the inner wall 12a of the fluid transfer pipe 12. The inventors have performed a simulation of the flow using computational fluid dynamics (CFD) and confirmed that the friction drag reduction effect of the wall deformation is achieved not only where the direction of progression of the traveling wave is the same as the fluid flow direction FD, such as with the fluid transfer pipe 12, but also where the direction of progression of the traveling wave is opposite to the fluid flow direction FD.

Patent Document 1 listed above includes findings concerning the appropriate amplitude, wavelength and phase velocity of the traveling wave for producing a traveling wave that reduces the friction drag (i.e. saves power) on a moving object in a fluid. In performing the simulation of the flow using CFD, the inventors have further confirmed that the findings described in Patent Document 1 listed above are applicable not only to an example where a traveling wave-like deformation is imparted to the outer wall of the moving body but also to an example where a traveling wave-like deformation propagating in the same direction as the flow direction FD is imparted to the fluid transfer pipe. That is, the inventors have confirmed that, to effectively reduce the friction drag of the fluid transfer pipe 12, it is preferred to use these findings and set at least one, or preferably all, of the parameters that are important for producing the traveling wave that reduces the friction drag, that is, the amplitude a (m), the wavelength λ (m) and the phase velocity c (m/s) of the traveling wave, according to the following formulas (1) to (3).

$$a = \alpha \times \frac{v}{u_\tau} \quad (1)$$

$$\lambda = \beta \times \frac{v}{u_\tau} \quad (2)$$

$$c = \gamma \times U_{lam} \quad (3)$$

In the formulas (1) to (3), coefficients α, β and γ are numerical values that fall within the respective ranges determined by the simulation of the flow using CFD: $3 \leq \alpha \leq 10$, $235 \leq \beta \leq 471$, and $\frac{2}{3} \leq \gamma \leq 1$. When the coefficients α, β and γ fall within the respective numerical value ranges, the amplitude a, the wavelength λ and the phase velocity c of the traveling wave that are effective for reducing the friction drag are achieved.

The remaining symbols in the above formulas are defined as follows.
v: fluid kinematic viscosity (m²/s)
$u_\tau$: wall friction velocity (m/s)
$U_{lam}$: flow velocity (m/s) of the fluid in the fluid transfer pipe (spiral pipe)

A wall friction velocity $u_\tau$ in the formulas (1) and (2) can be calculated according to a following formula (4) using a wall friction stress $\tau_w$ (Pa) and a fluid density ρ (kg/m³), for example. The wall friction stress $\tau_w$ can be calculated according to a following formula (5), for example.

$$u_\tau = \sqrt{\frac{\tau_w}{\rho}} \quad (4)$$

$$\tau_w = \frac{1}{2} \times \rho \times U_{lam}^2 \times \frac{0.455}{\log_{10}\left(\frac{U_{lam} \times L}{v}\right)^{2.58}} \quad (5)$$

In the above formula (5), reference symbol L denotes the length of the fluid transfer pipe in the flow direction FD, that is, the flow channel length (m).

(Specific Example of Fluid Transfer Apparatus)

Next, a specific example of the fluid transfer apparatus 10 configured so that the three parameters, the amplitude a, the wavelength λ and the phase velocity c of the traveling wave, satisfy the formulas (1) to (3) will be described. The fluid transfer apparatus 10 configured so that these parameters satisfy the formulas (1) to (3) can be provided by appropriately choosing the dimensions of the spiral pipe 14 and the characteristics of the pressure wave, based on information on the flow velocity of the fluid to be transferred.

More specifically, in this example, the flow velocity $U_{lam}$ of the fluid to be transferred is 25 m/s, and the flow channel length L (see FIG. 1A) of the fluid transfer pipe 12 is 0.3 m. In this specific example, it is assumed that the fluid to be transferred is air at room temperature, the kinematic viscosity $\nu$ is $1.58 \times 10^{-5}$ m²/s, and the density $\rho$ is 1.18 kg/m³. Thus, the wall friction velocity $u_\tau$ is calculated to be approximately 1.27 m/s according to the formulas (4) and (5).

Then, one example of the amplitude a of a preferred traveling wave can be calculated to be approximately $3.7 \times 10^{-5}$ m (37 μm) by substituting 3, for example, for the coefficient α, $1.58 \times 10^{-5}$ for the kinematic viscosity ν and 1.27 for the wall friction velocity $u_\tau$ in the formula (1).

One example of the wavelength λ of a preferred traveling wave can be calculated to be approximately $5.9 \times 10^{-3}$ m (5.9 mm) by substituting 471, for example, for the coefficient β, $1.58 \times 10^{-5}$ for the kinematic viscosity ν and 1.27 for the wall friction velocity $u_\tau$ in the formula (2).

Furthermore, one example of the phase velocity c of a preferred traveling wave can be calculated to be approximately 16.7 m/s by substituting ⅔, for example, for the coefficient γ and 25 for the flow velocity $U_{lam}$ in the formula (3). Although a flow field in which the flow velocity $U_{lam}$ is constant has been described above as an example, the fluid transfer apparatus according to the present application can be applied to a flow field in which the flow velocity $U_{lam}$ varies. When the flow velocity $U_{lam}$ varies, the flow velocity $U_{lam}$ can be detected with a sensor or the like, and the phase velocity c can be calculated based on the detected flow velocity $U_{lam}$, which is associated therewith.

Figure 6A:
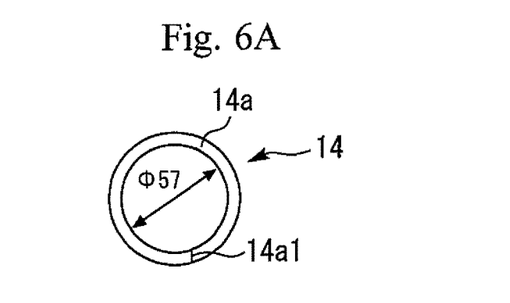
FIGS. 6A to 6C are diagrams for illustrating an example of setting of the dimensions of parts of a spiral pipe with which the characteristics of a preferred traveling wave are achieved.
Figure 6B:
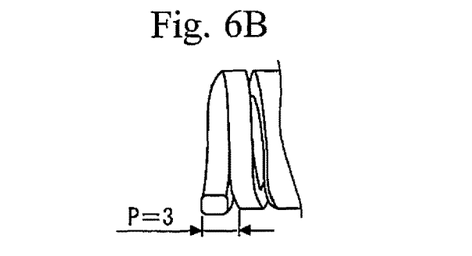
Figure 6C:
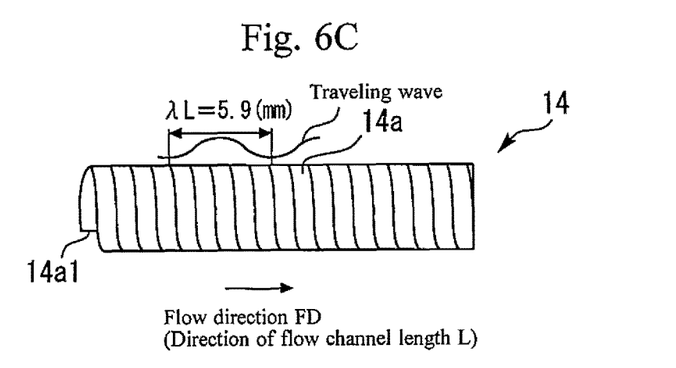

FIGS. 6A to 6C are diagrams for illustrating an example of setting of the dimensions of parts of the spiral pipe 14 with which the characteristics of a preferred traveling wave are achieved. FIG. 6B shows the shape of an inner wall of the tube 14a. As described above, desired values of the three parameters (amplitude a, wavelength λ and phase velocity c) of the traveling wave can be calculated as described above according to the formulas (1) to (3). If a pressure wave having the desired values is applied to the interior of the tube 14a, the fluid transfer apparatus 10 can exert an excellent friction drag reduction effect.

To enable application of the pressure wave having the desired values described above to the interior of the tube 14a, the dimensions (more specifically, inner diameter D (m) and spiral pitch p (m)) of the spiral pipe 14 and the characteristics (more specifically, amplitude ap (m) and frequency fp (Hz)) of the pressure wave are determined as described below. Concerning the pressure wave, a following equation (6) holds, where Pres denotes a pressure (sound pressure) in the tube 14a.

$$\text{Pres} = ap \times \sin(2 \times \pi \times fp \times t) \tag{6}$$

In the above formula (6), π denotes a ratio of the circumference of a circle to its diameter, and t denotes time (s). The pressure P varies centered on an atmospheric pressure P0 (which is assumed to be 100 kPa, in this example).

First, with reference to formulas (7) to (11), there will be described a specific method of determining the dimensions of the spiral pipe 14 and the characteristics of the pressure wave in such a manner that the desired values of the wavelength λ and the phase velocity c of the traveling wave are achieved. As described above, the fluid used as the medium (working fluid) in which the pressure wave propagates in this embodiment is helium. If the medium is helium at room temperature, the velocity C of sound is approximately 997 m/s.

$$\lambda p = \frac{C}{fp} \approx 0.35 \tag{7}$$

$$Lr = \pi \times D \approx 0.18 \tag{8}$$

$$N = \frac{\lambda p}{Lr} \approx 1.95 \tag{9}$$

$$\lambda L = \frac{\lambda p}{Lr} \times p = N \times p \approx 0.0059 \tag{10}$$

$$UL = \frac{p}{Lr} \times C \approx 16.7 \tag{11}$$

The reference symbols having not been described above in the formulas (7) to (11) are defined as follows.
λp: wavelength (m) of the pressure wave
Lr: circumferential length (m) of the spiral pipe 14
N: index value of how many times the pressure wave propagating in the tube 14a turns around the spiral pipe 14 in one wavelength of the pressure wave
λL: pseudo-wavelength (m) of the pressure wave viewed in the direction of the flow channel length L of the spiral pipe 14 (that is, in the fluid flow direction FD)
UL: propagation velocity of the pressure wave viewed in the direction of L (=the flow direction FD)

The pseudo-wavelength λL in the direction of L in the formula (10) corresponds to the wavelength λ of the traveling wave applied to the inner wall 12a of the fluid transfer pipe 12, and the propagation velocity UL in the direction of L in the formula (11) corresponds to the phase velocity c of the traveling wave. Thus, it can be seen from the formulas (7) to (11) that the fluid transfer apparatus 10 has an excellent friction drag reduction effect if a frequency fp of the pressure wave, an inner diameter D of the spiral pipe 14 and a pitch p of the spiral pipe 14 are determined in such a manner that the pseudo-wavelength λL of the pressure wave is equal to the desired value of the wavelength λ of the traveling wave, and the propagation velocity UL of the pressure wave is equal to the desired value of the phase velocity c of the traveling wave.

In this specific example, the frequency fp, the inner diameter D and the pitch p that satisfy the above requirement are 2850 Hz, 57 mm, and 3 mm, respectively. The numerical values in the formulas (7) to (11) comply with the calculation result in this specific example described below. The wavelength λp of the pressure wave can be calculated by dividing the velocity C of sound in the medium (helium, in this example) by the frequency fp, as shown in the formula (7). Therefore, the wavelength λp of the pressure wave can be calculated to be approximately 0.35 m (350 mm) by substituting 997 for the velocity C of sound and 285 for the frequency fp in the formula (7).

The circumferential length (length of the inner circumference) Lr of the spiral pipe 14 can be calculated to be approximately 0.18 m (180 mm) by substituting 57 for the inner diameter D of the spiral pipe 14 in the formula (8). The index value N of how many times the pressure wave turns around the spiral pipe 14 in one wavelength of the pressure wave can be calculated to be approximately 1.95 by substituting 0.35 for the wavelength λp and 0.18 for the circumferential length Lr in the formula (9). The pseudo-wavelength λL of the pressure wave in the direction of L can be calculated to be approximately 0.0059 m (5.9 mm) by substituting 1.95 for the index value N and 3 for the pitch p in the formula (10). The propagation velocity UL of the pressure wave in the direction of L can be calculated to be approximately 16.7 m/s by substituting 0.18 for the circumferential length Lr, 3 for the pitch p and 997 for the velocity C of sound in the formula (11).

As can be seen from the above calculation example, the pseudo-wavelength λL of the pressure wave that complies with the desired value of the wavelength λ of the traveling wave and the propagation velocity UL of the pressure wave that complies with the desired value of the phase velocity c of the traveling wave can be obtained by appropriately determining the frequency fp, the inner diameter D and the pitch p.

On the other hand, the amplitude ap of the pressure wave required for achieving the desired value of the amplitude a of the traveling wave can, for example, be determined as follows. That is, the amplitude ap of the pressure wave is determined to be a value (sound pressure) that complies with the amplitude a of the traveling wave by considering the material and thickness ti (see FIG. 2) of the tube 14a. Even if a pressure wave having the same amplitude ap is applied to the tube 14a, the way of deformation of the tube 14a varies depending on whether there is the outer pipe 16 or not. Therefore, when there is the outer pipe 16 as in this embodiment, the determination of the amplitude ap of the pressure wave is made by considering the way of deformation of the tube 14a due to the presence of the outer pipe 16. More specifically, with the fluid transfer apparatus 10 according to this embodiment that uses the speaker 22 to generate the pressure wave, in the end, the power (w) required to achieve the sound pressure that complies with the amplitude a of the traveling wave is determined.

In the approach described above, settings (more specifically, the inner diameter D and the pitch p of the spiral pipe 14, and the amplitude ap and the frequency fp of the pressure wave) of the fluid transfer apparatus 10 required for achieving the desired values of the three parameters (amplitude a, wavelength λ and phase velocity c) of the traveling wave can be obtained. Therefore, a more excellent friction drag reduction effect than where the desired values are not taken into consideration can be achieved by preparing the spiral pipe 14 that complies with the above-described settings of the dimensions and by the ECU 24 controlling the characteristics of the pressure wave generated by the speaker 22 in such a manner that the amplitude ap and the frequency fp that comply with the above-described settings of the pressure wave are achieved.

Second Embodiment

Next, a second embodiment of the present application will be described with reference to FIGS. 7 and 8.

Configuration of Fluid Transfer Apparatus According to Second Embodiment

The pressure wave applied to the interior of the tube 14a of the spiral pipe 14 in the first embodiment described above gradually attenuates as the pressure wave propagates. If the pressure wave reaches the end of the tube 14a on the front side in the progression direction before the pressure wave completely attenuates and disappears, the pressure wave is reflected. If so, an incident wave and a reflected wave may be superimposed to form a standing wave. If such a standing wave occurs, the friction drag reduction effect based on the traveling wave-like wall deformation may be decreased or eliminated, or on the contrary the friction drag may increase. In the following, an arrangement suitable for reducing the effect of the reflection of the pressure wave according to this embodiment will be described.

Figure 7:
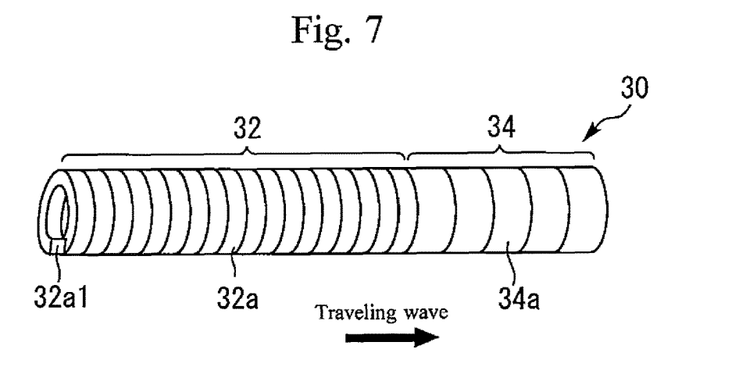
FIG. 7 is a perspective view of the whole of a spiral pipe used in a second embodiment of the present application.

FIG. 7 is a perspective view of the whole of a spiral pipe 30 used in the second embodiment of the present application. A fluid transfer apparatus according to this embodiment corresponds to a fluid transfer apparatus obtained by replacing, with the spiral pipe 30, the spiral pipe 14 of the fluid transfer apparatus 10 according to the first embodiment. As shown in FIG. 7, the spiral pipe 30 includes a first spiral part 32 and a second spiral part 34. The first spiral part 32 is formed by a tube 32a wound in a spiral manner to form a pipe. In this embodiment, it is assumed that the first spiral part 32 is configured in the same way as the spiral pipe 14 formed by the tube 14a. More specifically, the speaker 22 (not shown in FIG. 7) is connected to a pressure wave inlet 32a1, which is one end of the tube 32a. In the first spiral part 32, the pressure wave applied to the interior of the tube 32a is positively used to achieve the friction drag reduction effect based on the traveling wave-like wall deformation.

The second spiral part 34 is located immediately ahead of the first spiral part 32 in the progression direction of the traveling wave. The second spiral part 34 is formed by a tube 34a wound in a spiral manner to form a pipe. The other end of the tube 32a of the first spiral part 32 (the end on the front side in the progression direction of the traveling wave) is an open end, and the tube 32a is connected at this open end to one end of the tube 34a of the second spiral part 34 (the end of the tube 34a on the rear side in the progression direction of the traveling wave). The other end of the tube 34a may be an open end or a closed end.

Figure 8:
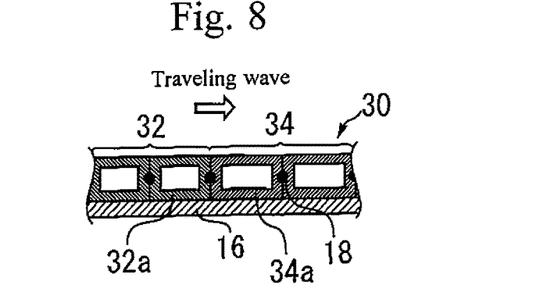
FIG. 8 is a cross-sectional view of tubes around an interface between a first spiral part and a second spiral part.

FIG. 8 is a cross-sectional view of the tubes 32a and 34a around the interface between the first spiral part 32 and the second spiral part 34. As shown in FIG. 8, the shape of the cross section of the tube 34a is set so that the cross-sectional area of the flow channel thereof is greater than the cross-sectional area of the flow channel of the tube 32a. To achieve this setting, the tube 34a is shaped to have a width in the progression direction of the traveling wave greater than that of the tube 32a, in order that the inner diameter of the spiral pipe 30 does not change at the point of change of the fluid flow channel from the first spiral part 32 to the second spiral part 34 and the outer diameter of the spiral pipe 30 does not change at the point because there is the outer pipe 16 in the arrangement according to this embodiment. The flow channel length of the second spiral part 34 is set to be a length required for the pressure wave propagating in the tube 34a to completely attenuate and disappear.

Since the cross-sectional area of the flow channel of the tube 34a of the second spiral part 34 is greater than the cross-sectional area of the flow channel of the tube 32a of the first spiral part 32, the pressure wave entering the tube 34a from the tube 32a more readily attenuates in the tube 34a. Thus, with the spiral pipe 30 according to this embodiment, the pressure wave can be sufficiently attenuated in the second spiral part 34. That is, the second spiral part 34 serves as a pressure wave attenuation part that attenuates the pressure wave. Therefore, at the end of the spiral pipe 30 on the front side in the progression direction of the traveling wave (that is, the end of the second spiral part 34 on the front side in the progression direction of the traveling wave), reflection of the pressure wave having propagated through the second spiral part 34 can be effectively suppressed. As a result, the deterioration of the friction drag reduction effect due to occurrence of a standing wave can be reduced. If the cross-sectional area of the flow channel of the tube in which the pressure wave propagates abruptly increases, the pressure wave may be more readily reflected. Therefore, the cross-sectional area of the flow channel of the tube 34a is set not to cause such a reflection. In this respect, the tube 34a of the second spiral part 34 may also be configured so that the cross-sectional area of the flow channel of the tube 34a gradually increases as it goes toward the end on the front side in the progression direction of the traveling wave.

As described above, the spiral pipe 30 according to this embodiment includes the second spiral part 34 that serves as a pressure wave attenuation part. Therefore, according to the spiral pipe 30, a spiral pipe that propagates the pressure wave and then completely attenuates the pressure wave (in other words, a spiral pipe that propagates the pressure wave while suppressing occurrence of a standing wave) can be achieved with a smaller flow channel length, as compared with the spiral pipe 14 that does not include the second spiral part 34. Therefore, with this configuration, the fluid transfer apparatus according to the present application can be installed with less constraints due to the flow channel length of the fluid transfer pipe required for the functionality of the spiral pipe.

In a section of the pressure wave attenuation part, the pressure wave remains to some extent after attenuating. With the configuration according to this embodiment, a part of the spiral pipe 30 forms the pressure wave attenuation part. Therefore, the pressure wave attenuation part can be provided while maintaining the friction drag reduction effect.

With the spiral pipe 30 according to the second embodiment described above, the second spiral part 34 formed by the tube 34a having a greater cross-sectional area of the flow channel than the tube 32a of the first spiral part 32 is provided to suppress reflection of the pressure wave. However, the specific configuration of the pressure wave attenuation part according to the present application is not limited to this configuration, and other configurations, such as those described below, are also possible.

Figure 9:
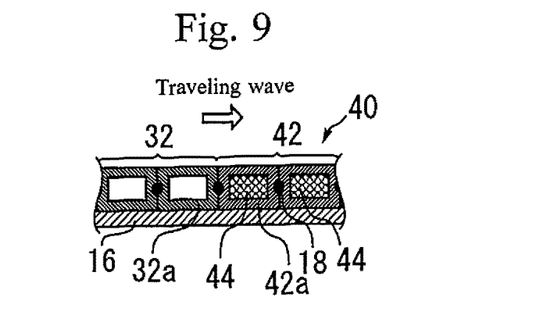
FIG. 9 is a diagram for illustrating another example of the pressure wave attenuation part according to the present application.

FIG. 9 is a diagram for illustrating another example of the pressure wave attenuation part according to the present application. A spiral pipe 40 shown in FIG. 9 differs from the spiral pipe 30 shown in FIG. 8 in that the configuration of a second spiral part 42 that functions as the pressure wave attenuation part is different from that of the second spiral part 34. FIG. 9 shows cross sections of tubes 32a and 42a around the interface between the first spiral part 32 and the second spiral part 42.

The interior of the tube 42a of the second spiral part 42 shown in FIG. 9 is filled with a sound absorbing material (wool, for example). With such a configuration, the pressure wave entering the tube 42a from the tube 32a more readily attenuates because of a sound absorbing material 44. Thus, such a second spiral part 42 can positively suppress reflection of the pressure wave. However, if the amount of the sound absorbing material 44 filling the tube 42a is excessive, the sound absorbing material 44 facilitates reflection of the pressure wave. The amount of the sound absorbing material 44 is set so as to avoid such reflection.

Figure 10:
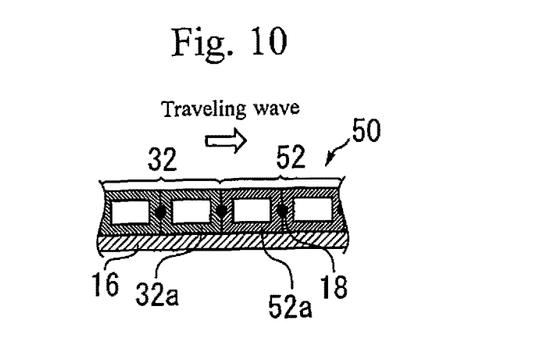
FIG. 10 is a diagram for illustrating another example of a pressure wave attenuation part according to the present application.

FIG. 10 is a diagram for illustrating another example of the pressure wave attenuation part according to the present application. A spiral pipe 50 shown in FIG. 10 differs from the spiral pipe 30 shown in FIG. 8 in that the configuration of a second spiral part 52 that functions as the pressure wave attenuation part is different from that of the second spiral part 34. As shown in FIG. 10, the second spiral part 52 may be formed by a tube 52a that is made of a softer material than the tube 32a of the first spiral part 32. The softer tube 52a more readily expands and contracts than the tube 32a, as the pressure wave propagates through the tube 52a. As a result, the pressure wave more readily attenuates as it propagates through the tube 52a.

Figure 11:
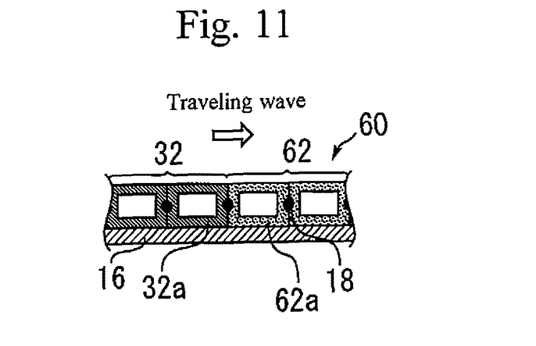
FIG. 11 is a diagram for illustrating another example of a pressure wave attenuation part according to the present application.

FIG. 11 is a diagram for illustrating another example of the pressure wave attenuation part according to the present application. A spiral pipe 60 shown in FIG. 11 differs from the spiral pipe 30 shown in FIG. 8 in that the configuration of a second spiral part 62 that functions as the pressure wave attenuation part is different from that of the second spiral part 34. As shown in FIG. 11, the second spiral part 62 may be formed by a tube 62a that is made of a porous material having an elasticity (a porous rubber, for example). With such a configuration in which the inner wall of the tube 62a is formed by a porous material, the pores in the surface of the inner wall of the tube 62a facilitate attenuation of the pressure wave.

Figure 12:
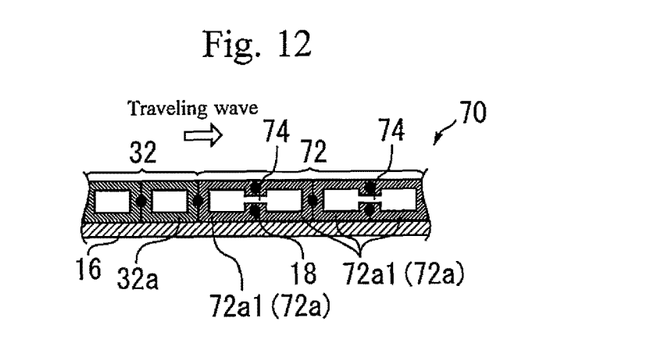
FIG. 12 is a diagram for illustrating another example of a pressure wave attenuation part according to the present application.

FIG. 12 is a diagram for illustrating another example of the pressure wave attenuation part according to the present application. A spiral pipe 70 shown in FIG. 12 differs from the spiral pipe 30 shown in FIG. 8 in that the configuration of a second spiral part 72 that functions as the pressure wave attenuation part is different from that of the second spiral part 34. As shown in FIG. 12, provided that one turn of a tube 72a wound in a spiral manner to form the second spiral part 72 is a unit tube, each unit tube 72a1 is in communication with one of the adjacent two unit tubes 72a1 through a communication hole 74. With such a configuration shown in FIG. 12, a part of the tube wall separating the flow channels of the adjacent turns of the tube 72a wound in a spiral manner is cut. With such a configuration, the pressure wave can be more readily attenuated by a mechanism similar to that in the example shown in FIG. 8 in which the cross-sectional area of the flow channel is increased. Cutting an excessively large part of the tube wall is equivalent to abruptly increasing the cross-sectional area of the flow channel of the tube and may facilitate reflection of the pressure wave. A range of the part of the tube wall to be cut is set so as to prevent such reflection.

The pressure wave attenuation part according to the present application may be provided by combining any of the configuration examples shown in FIGS. 8 to 12. Furthermore, as an alternative to or in addition to the pressure wave attenuation part, reflection of the pressure wave may be suppressed by the measure shown in FIG. 13 described below.

Figure 13:
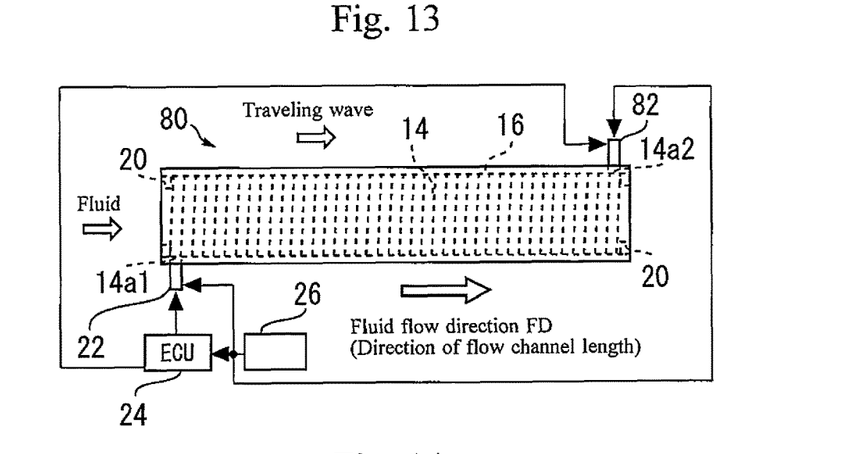
FIG. 13 is a diagram for illustrating an example of a configuration of a fluid transfer apparatus suitable for suppressing reflection of a pressure wave.

FIG. 13 is a diagram for illustrating an example of the configuration of a fluid transfer apparatus suitable for suppressing reflection of a pressure wave. A fluid transfer apparatus 80 shown in FIG. 13 is basically the same as the fluid transfer apparatus 10 shown in FIG. 1A and FIG. 1B except for the points described below. As shown in FIG. 13, with the fluid transfer apparatus 80, the end of the tube 14a at the downstream end of the spiral pipe 14 in the flow direction FD is an open end that serves as a pressure wave outlet 14a2. A speaker 82 (which corresponds to a second pressure wave generator) is connected to the pressure wave outlet 14a2. The speaker 82 is supplied with electric power by the battery 26. The speaker 82 has a function of detecting the pressure wave that is generated by the speaker 22 and reaches the pressure wave outlet 14a2. The speaker 82 is controlled by the ECU 24 to generate a pressure wave with a phase opposite to that of the detected pressure wave. With such a configuration, the pressure wave reaching the pressure wave outlet 14a2 can be canceled by the pressure wave with opposite phase generated by the speaker 82. In this way, reflection of the pressure wave generated by the speaker 22 can be suppressed. When this configuration is combined with any of the configurations including the pressure wave attenuation part shown in FIGS. 8 to 12, the speaker 82 is disposed at the end of the pressure wave attenuation part on the front side in the progression direction of the traveling wave.

In the first and second embodiments described above, the speaker 22 is disposed at the end of the tube 14*a* at the upstream end of the spiral pipe 14 in the flow direction FD. However, the part (pressure wave inlet 14*a*1) at which the pressure wave is applied to the interior of the tube by the pressure wave generator such as the speaker 22 is not limited to the end of the tube wound in a spiral manner to form a pipe as in the above example. It can be said that the pressure wave inlet is preferably disposed as close to the end of the tube as possible from the viewpoint that the flow channel length of the fluid transfer pipe that exerts the friction drag reduction effect can be increased. However, when it is difficult to dispose the pressure wave inlet at the end of the tube as in the examples described above because of limitations on the installation of the fluid transfer apparatus, for example, the pressure wave inlet may be disposed apart from the end of the tube.

Figure 14:
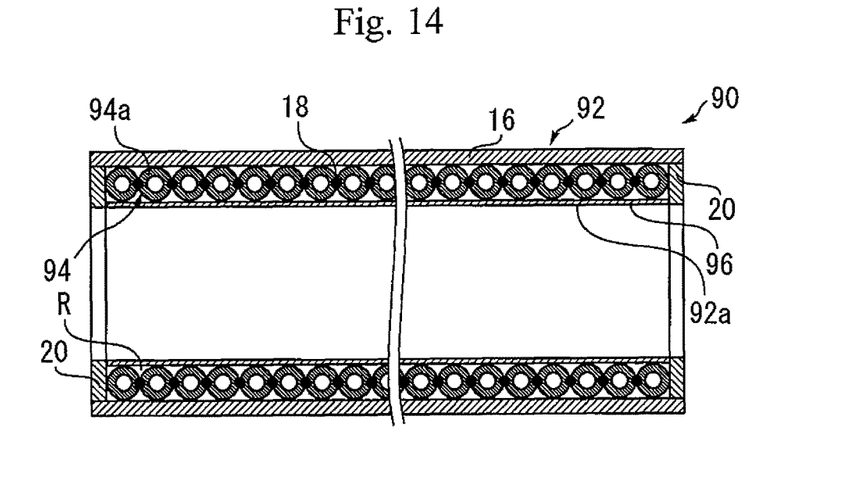
FIG. 14 is a cross-sectional view for illustrating main components of another fluid transfer apparatus according to the present application.

In the first and second embodiments described above, the tube 14*a* has a quadrangular (more specifically, rectangular) cross section, as an example. FIG. 14 is a cross-sectional view for illustrating main components of another fluid transfer apparatus 90 according to the present application. A fluid transfer apparatus 90 shown in FIG. 14 includes a fluid transfer pipe 92. The fluid transfer pipe 92 includes a spiral pipe 94 formed by a tube 94*a* having a circular cross section wound in a spiral manner. Outer wall surfaces of adjacent turns of the tube 94*a* wound in a spiral manner are bonded to each other by an adhesive 18.

In the configuration shown in FIG. 14, an inner pipe 96 is provided in contact with an inner circumference of the spiral pipe 94. The inner pipe 96 is a straight pipe and provides a smooth inner wall 92*a* of the fluid transfer pipe 92. In this configuration, a fluid flows inside the inner pipe 96 in the spiral pipe 94. With such a configuration, the inner pipe 96 needs to expand and contract in synchronization with the expansion and contraction of the spiral pipe 94 when the pressure wave is applied. Therefore, the inner pipe 96 is made of a material having a softness comparable to that of the spiral pipe 94 (tube 94*a*).

The fluid transfer pipe 92 having the configuration described above can, for example, be manufactured by winding the tube 94*a* around the outer circumference of the inner pipe 96 to form the spiral pipe 94 having the inner pipe 96 as a core, and press-fitting the spiral pipe 94 into the outer pipe 16. Note that the inner pipe 96 is not always necessary even if the tube 94*a* having a circular cross section is used. If the inner wall of the fluid transfer pipe 92 needs to be smooth in the configuration without the inner pipe 96, gaps R (see FIG. 14) between adjacent turns of the tube 94*a* may be filled with an elastic seal material, for example. As required, an inner pipe similar to the inner pipe 96 may be used in combination with the above-described tube 14*a* having a quadrangular cross section, for example.

Figure 15:
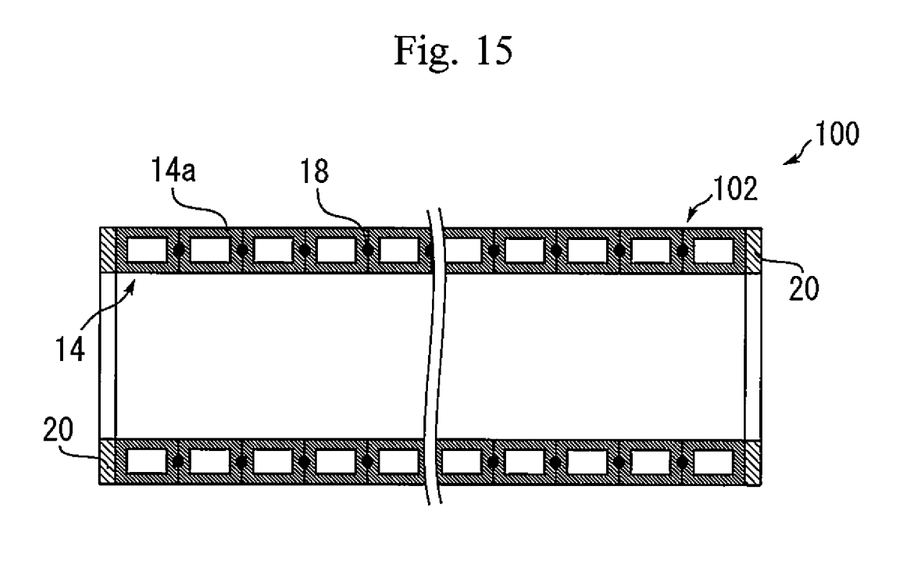
FIG. 15 is a cross-sectional view for illustrating main components of another fluid transfer apparatus according to the present application.

In the first and second embodiments described above, the outer pipe 16 is provided to surround the spiral pipe 14, for example. FIG. 15 is a cross-sectional view for illustrating main components of another fluid transfer apparatus 100 according to the present application. A fluid transfer apparatus 100 shown in FIG. 15 differs from the fluid transfer apparatus 10 shown in FIG. 1A and FIG. 1B in that the fluid transfer apparatus 100 is not provided with the outer pipe 16. That is, the fluid transfer apparatus 100 has a fluid transfer pipe 112 that is formed only by the spiral pipe 14 formed by the tube 14*a* wound in a spiral manner.

In the first and second embodiments described above, the fluid transfer pipe 12 is a straight pipe in which the fluid flows straight in the flow direction FD, for example. However, the fluid transfer pipe formed only by the spiral pipe according to the present application or the fluid transfer pipe including the spiral pipe may be a bent pipe in which the fluid flows in a varying flow direction FD.

What is claimed is:

1. A fluid transfer apparatus, comprising:
   a spiral pipe which is formed by an elastic tube wound in a spiral manner and in which a fluid to be transferred flows; and
   a speaker configured to generate a periodic pressure wave in a working fluid that flows in the tube and that serves as a medium of the pressure wave, the pressure wave causing a change of a cross-sectional area of a flow channel of the tube, which is an area of a cross section of the tube that is perpendicular to an axial direction of the tube, the change of the cross-sectional area of the flow channel of the tube being a periodic increase and decrease of the cross-sectional area.

2. The fluid transfer apparatus according to claim 1, wherein the spiral pipe includes a pressure wave attenuation portion thereof that is configured to attenuate the pressure wave, the pressure wave attenuation portion being a portion of the spiral pipe on a rear side in a progression direction of the pressure wave propagating in the tube.

3. The fluid transfer apparatus according to claim 2, wherein the spiral pipe is configured so that the cross-sectional area of the flow channel of the tube in the pressure wave attenuation portion is greater than a cross-sectional area of the flow channel of the tube in a part other than the pressure wave attenuation portion.

4. The fluid transfer apparatus according to claim 2, wherein an interior of the pressure wave attenuation portion is filled with a sound absorbing material.

5. The fluid transfer apparatus according to claim 2, wherein the pressure wave attenuation portion of the spiral pipe is made of a material softer than a material of a part other than the pressure wave attenuation portion.

6. The fluid transfer apparatus according to claim 2, wherein an inner wall of the pressure wave attenuation portion is made of a porous material.

7. The fluid transfer apparatus according to claim 2, wherein, in the pressure wave attenuation portion, a part of a tube wall that separates inner channels of adjacent turns of the wound tube in a spiral manner is cut.

8. The fluid transfer apparatus according to claim 1, further comprising a second speaker that is connected to an end of the tube on a rear side in a progression direction of the pressure wave propagating in the tube and configured to generate a pressure wave with a phase opposite to that of the pressure wave reaching at the end of the tube.

9. The fluid transfer apparatus according to claim 1, further comprising an outer pipe that is made of a harder material than the tube and is formed to surround the spiral pipe.

10. The fluid transfer apparatus according to claim 1, wherein an amplitude a of a traveling wave that is produced in an inner wall of the spiral pipe by propagation of the pressure wave in the tube and propagates in a direction of flow of the fluid to be transferred satisfies a relation expressed by a following formula (1):

$$a = \alpha \times \frac{v}{u_\tau} \Lambda \qquad (1)$$

where a coefficient α falls within a range of 3≤α≤10, ν denotes a kinematic viscosity of the fluid to be transferred, and $U_\tau$ denotes a wall friction velocity.

11. The fluid transfer apparatus according to claim 1,
wherein a wavelength λ of a traveling wave that is produced in an inner wall of the spiral pipe by propagation of the pressure wave in the tube and propagates in a direction of flow of the fluid to be transferred satisfies a relation expressed by a following formula (2):

$$\lambda = \beta \times \frac{v}{u_\tau} \Lambda \qquad (2)$$

where a coefficient β falls within a range of 235≤β≤471, ν denotes a kinematic viscosity of the fluid to be transferred, and $U_\tau$ denotes a wall friction velocity.

12. The fluid transfer apparatus according to claim 1,
wherein a phase velocity c of a traveling wave that is produced in an inner wall of the spiral pipe by propagation of the pressure wave in the tube and propagates in a direction of flow of the fluid to be transferred satisfies a relation expressed by a following formula (3):

$$c = \gamma \times U_{lam} \Lambda \qquad (3)$$

where a coefficient γ falls within a range of ⅔≤γ≤1, and $U_{lam}$ denotes a flow velocity of the fluid to be transferred that flows in the spiral pipe.

\* \* \* \* \*